March 17, 1936.  H. A. CENTERVALL  2,033,920
HYDRAULIC POWER SYSTEM
Filed June 3, 1933
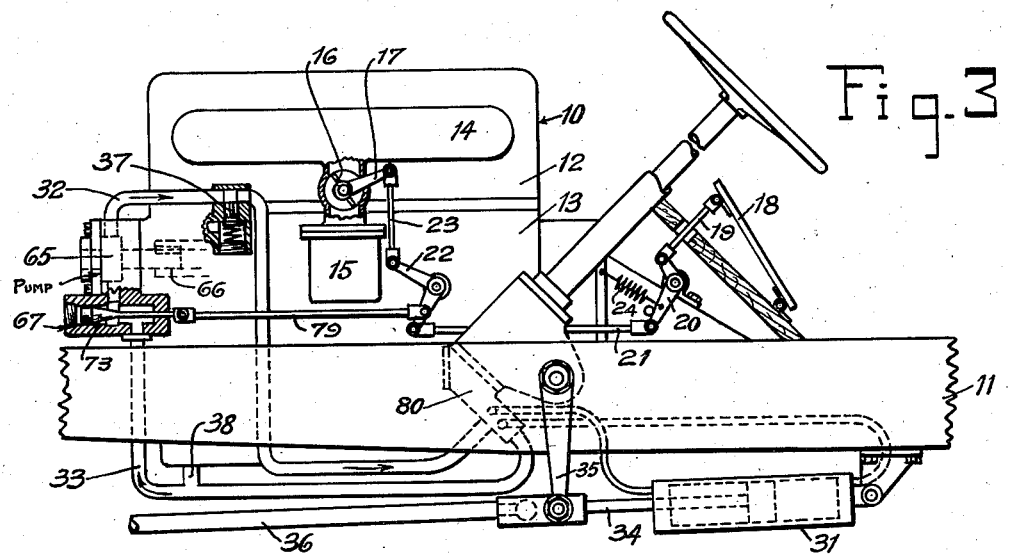
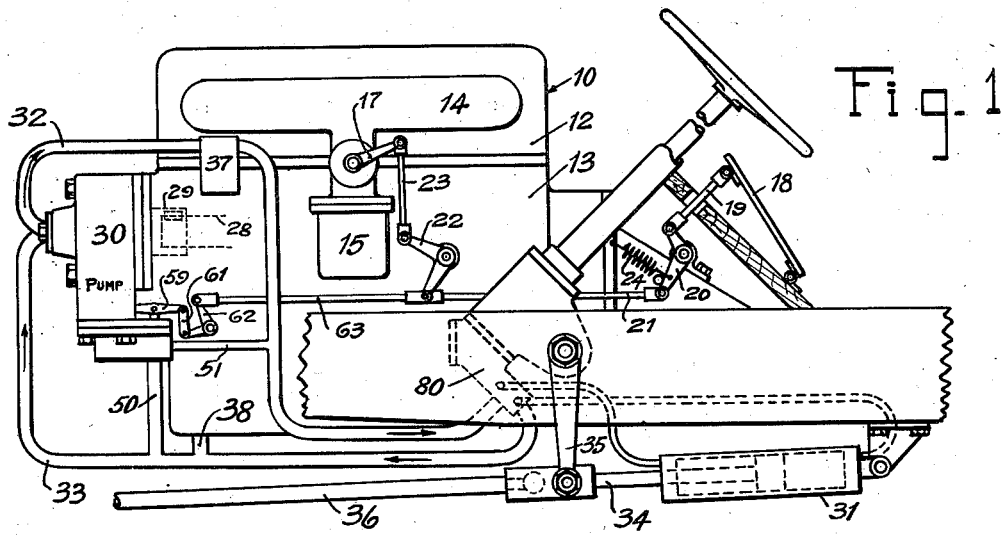
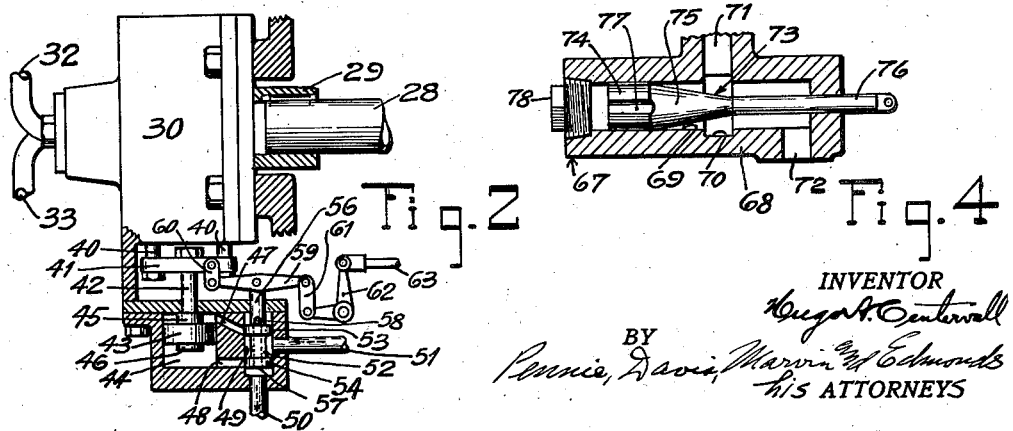
INVENTOR
Hugo A. Centervall
BY Pennie, Davis, Marvin and Edmonds
his ATTORNEYS Patented Mar. 17, 1936

2,033,920

UNITED STATES PATENT OFFICE 2,033,920

HYDRAULIC POWER SYSTEM

Hugo A. Centervall, Brooklyn, N. Y., assignor to Manly Corporation, New York, N. Y., a corporation of New York Application June 3, 1933, Serial No. 674,178

11 Claims. (Cl. 103—37)

This invention relates to means for controlling the output from a source of fluid pressure which is driven at variable speed. One important use for it is in connection with fluid pressure operated devices when employed to perform such functions as steering, braking or clutch operation on a motor vehicle. I have accordingly chosen to illustrate the invention as applied to a motor vehicle provided with hydraulic power steering.

In order for the driver to retain full control of the vehicle at all times it is obviously necessary that he be able to turn the vehicle any desired amount either as slowly or as rapidly as he may wish, regardless of the speed at which the vehicle is moving. When steering is effected by hydraulic power means it is, therefore, necessary for the source of fluid pressure (usually a pump) to at all times deliver a given quantity of fluid at a rate which causes the hydraulic steering apparatus to move the steering members at the maximum rate of speed which the driver may ever wish to employ under any conditions. In systems heretofore proposed a constant displacement pump has been operated by the driving engine of the vehicle and the pump made of a capacity large enough to deliver this required maximum volume of fluid in the minimum required time with the engine running at low speed.

It is at once evident that as the speed of the engine increases the volume of fluid delivered by the pump increases proportionally so that more fluid is pumped than is needed. This results in power losses which become appreciable at the higher engine speeds and is apt to cause trouble due to heating or to churning of the fluid. If a smaller pump is used, however, the supply of fluid available at the lower engine speeds is insufficient to operate the hydraulic power steering device as rapidly as may be desired; this is particularly true when the vehicle makes a sharp turn, such as the average right hand turn, which makes necessary a relatively great reduction of speed of the vehicle and hence a corresponding reduction of the volume of fluid delivered by the pump in any given time interval, whereas maximum volume is needed by the hydraulic steering device.

An object of this invention is to provide simple and effective means whereby the source of fluid pressure delivers a substantially constant volume of fluid, regardless of the speed of the driving engine, so that the required volume is always available but there is never any material excess. Other objects will appear from the following description of an illustrative embodiment of the present invention.

In the drawing:

Figure 1 is a side elevation of a motor vehicle embodying one form of the present invention.

Figure 2 is an enlarged view, partly in section, of the variable capacity pump and the stroke varying apparatus shown in Figure 1.

Figure 3 is a side elevation, partly in section, of a motor vehicle embodying an alternative form of the present invention.

Figure 4 is an enlarged sectional view of the inlet control valve shown in Figure 3.

Referring now to Figs. 1 and 3 of the drawing, the usual internal combustion driving engine 10 is supported in any preferred manner upon the frame of the vehicle, a portion of one side member 11 of which is shown. The engine 10 comprises the usual cylinder block 12 and crank case 13 and is operatively connected with the rear road wheels, not shown, by means of the usual transmission mechanism, not shown. Fuel is supplied to the cylinders through the intake manifold 14 and the carburetor 15, here presumed to be of the conventional float feed type having a butterfly or control valve 16 which controls the admission of fuel to the manifold and hence controls the speed and power output of the engine 10. In Figs. 1 and 3 the butterfly valve 16 is shown in its normally closed position, admitting only enough fuel to permit the engine 10 to run at its idling speed.

Movement of the butterfly valve 16 is effected by means of a rigidly attached arm 17 whose outer end is actuated and controlled by the accelerator pedal 18 acting upon it through a link 19, a bell crank 20, a link 21, a second bell crank 22 and a connecting link 23. The arrangement is such that depressing the accelerator pedal 18 causes a correspondingly increased opening of the butterfly valve 16 and, generally speaking, an increase in the speed of the driving engine 10, thus allowing the driver to control the speed of the vehicle by the accelerator pedal 18 in the usual manner. The spring 24 attached to the bell crank 20 returns the parts toward or to their normally closed position when pressure on the accelerator pedal 18 is reduced or removed.

The fluid circuit as shown in Fig. 1 includes a pump 30 whose driving shaft 29 is connected to the cam shaft 28 of the engine 10. The high pressure or discharge pipe 32 leads from the discharge port of the pump 30 and terminates in the control valve mechanism 80 of the hydraulic power steering apparatus. The hydraulic power steering mechanism is here shown schematically and forms no part per se of the present invention. It may be of any preferred type, and as here shown comprises a hydraulic cylinder 31, the piston rod 34 of which is operatively connected with the steering arm 35 and link 36, the latter as will be understood, serving to transmit the desired motion to the front wheels of the vehicle. It will be understood that when the vehicle's steering wheel is turned in one direction or the other this actuates the control valve mechanism 80 which controls the admission and discharge of pressure fluid to and from the hydraulic cylinder 31.

The low pressure or return pipe 33 connects the control valve mechanism 80 with the suction side of said pump 30. In order to protect the apparatus, the maximum permissible pressure in the high pressure portions of the fluid circuit is limited by the safety or blow-off valve member 37 which is connected with the high pressure pipe 32, the arrangement being such that excess fluid is returned to the interior of the crankcase 13 through a passageway (not shown) in the side of valve 37. The return pipe 33 is also connected with the interior of the crank case 13 by means of the supply pipe 38 so that said return pipe 33 is kept filled at all times.

The pump 30 is here shown as of variable capacity and may be of any desired kind but I prefer to use one of the type disclosed in my co-pending application for Letters Patent of the United States filed April 28, 1932 and given Serial Number 607,927, now Patent No. 2,001,706, granted May 21, 1935. The variable capacity pump includes rotating radial cylinders, fitted with pistons which are caused to reciprocate by a slidably mounted crank mechanism of such design and construction that the length of the stroke of said pistons, and hence the capacity of the pump, may be varied from maximum to zero by sliding said crank mechanism transversely to the axis of rotation. With the parts in the position shown in Figs. 1 and 2, the crank mechanism, which is attached to the inner ends of guide studs 40, is in its extreme outward or eccentric position, and the length of the stroke of the pistons is therefore maximum so that the pump delivers its maximum volume of fluid per revolution. Movement of the guide studs 40 downwardly as viewed in said Figs. 1 and 2, carrying the crank mechanism therewith, causes a corresponding reduction in the length of the stroke of the pump pistons, and hence in the delivery per revolution of the pump, until the crank mechanism reaches its concentric or zero stroke position when no fluid is discharged by said pump.

In order that the stroke of the pistons of the pump 30 may be altered with substantially no effort on the part of the driver, I provide a simple power adjusting or stroke varying device which is clearly shown in Fig. 2. The guide studs 40 whose inner ends are connected to the slidable crank mechanism are attached at their outer ends to the cross head 41. A piston rod 42 connects the cross head 41 to the double-acting piston 43 which is slidably fitted within the adjusting cylinder 44. A stop 45 limits the upward movement of the piston 43, and hence the maximum eccentricity of the slidable crank mechanism, and a similar stop 46 limits the downward movement of said piston 43 and of said slidable crank mechanism. I prefer to make the stop 46 of such size that the slidable crank mechanism is prevented from moving into its concentric or zero stroke position so that the pistons of said pump 30 always have a stroke equal to or exceeding the minimum thus determined which is preferably made an amount causing said pump 30 to deliver fluid at the desired rate when it is being driven by the engine 10 at its maximum speed. The upper and lower ends of the adjusting cylinder 44 are connected by passageways 47 and 48 respectively with the cylindrical valve bore 49 whose lower end is connected to the return pipe 33 by the pipe 50. The valve bore 49 is also connected to the high pressure pipe 32 by the pipe 51 which enters said valve bore 49 at a point midway between the ports formed by its intersection with said passages 47 and 48.

The valve bore 49 is slidably fitted with a piston type adjusting valve member 52 having two heads 53 and 54 respectively and having a stem 56 which projects through a suitable opening in the upper closure of said valve bore 49. The adjusting valve 52 is formed with a longitudinal passage 57, indicated in dotted lines, which extends from the lower end of said valve member 52 to a point above the head 53 where it connects with a radial passage 58 in the stem 56. The heads 53 and 54 are adapted to cover the ports formed by the intersection of the valve bore 49 and the passages 47 and 48 respectively when the adjusting valve 52 is in its neutral position as shown in Fig. 2.

The arrangement is such that when the adjusting valve member 52 is moved upwardly, pressure fluid from the pipe 51 passes into the valve bore 49 around the reduced portion between the heads 53 and 54 of said adjusting valve 52, through the passage 47 and into the upper end of the adjusting cylinder 44, causing the piston 43 to move downwardly and so decreasing the stroke of the pistons of the pump 30; fluid from the lower end of said adjusting cylinder 44 passes out through the lower end of said valve bore 49 and the pipe 50 into the return pipe 33. Similarly, downward movement of the adjusting valve 52 admits pressure fluid to the lower end of the adjusting cylinder 44, causing the piston 43 to move upwardly and thus increasing the stroke of the pistons of the pump 30; fluid exhausted from the upper end of said adjusting cylinder 44 passes into the upper end of the valve bore 49, through the radial passage 58 and the longitudinal passage 57 into the lower end of said valve bore 49 and thence through the pipe 50 into the return pipe 33.

The length of the stroke of the pistons of the pump 30 may thus be varied by power operated means and the only effort expended by the driver is the amount necessary to move the adjusting valve 52, which is negligible.

Movement and control of the adjusting valve 52 is effected by linkage connected with the cross head 41 and with the bell crank 22 and includes a lever 59 pivotally connected intermediate of its ends with the end of the valve stem 56. One end of the lever 59 is pivotally connected with one end of a short link 60 whose other end is likewise pivotally connected with the cross head 41. The other end of the lever 59 is pivotally connected to one end of a link 61 whose other end is likewise pivotally connected to one arm of the bell crank 62 which is supported in any appropriate manner. The other arm of the bell crank 62 is operatively connected with the depending arm of the bell crank 22 by a link member 63.

By this arrangement, when the driver depresses the accelerator pedal 18 and thus increases the speed of the driving engine 10, the depending arm of the bell crank 22 is moved rearwardly, thus causing the bell crank 62 to swing on its pivot and to move upwardly the link 61 and the connected end of the lever 59 whose other end acts as a fulcrum. The adjusting valve 52 is thus moved upwardly, admitting pressure fluid to the upper end of the adjusting cylinder 44 and moving the piston 43 and its connected mechanism downwardly, thus decreasing the length of the stroke of the pistons of the pump 30. As the cross head 41 moves downward, however, it carries with it the link 60 and the attached end of the lever 59 which swings on its other end as a fulcrum, thus tending to move the adjusting valve 52 downwardly and producing a follow-up action. The movement of the piston 43 continues until it has moved a distance corresponding to the distance moved by the accelerator pedal 18, when the follow-up action returns the adjusting valve 52 to its neutral position and both ends of the adjusting cylinder 44 are cut off from communication with the valve bore 49. When pressure on the accelerator pedal 18 is removed or reduced and the speed of the driving engine 10 is thus decreased, the adjusting valve 52 is similarly moved downwardly, allowing pressure fluid to enter the lower end of the adjusting cylinder 44 which moves the piston 43 and its attached mechanism upwardly and thus increases the length of the stroke of the pistons of the pump 30 and hence the volume of fluid delivered per revolution by it.

The delivery per revolution of the pump 30 is thus varied inversely with the speed of the driving engine 10, and hence with the speed of said pump 30. As the decrease of the speed of said pump 30 is offset by increase of its capacity per revolution, or vice versa, said pump 30 discharges pressure fluid into the pipe 32 at a substantially constant rate, regardless of the speed of the driving engine 10, assuring at all times a proper volume of fluid to operate the hydraulic steering or other apparatus, yet producing no excessive volume at high speeds of the engine 10.

The embodiment of my invention shown in Figs. 3 and 4 differs from that shown in Figs. 1 and 2 in that a constant displacement pump 65 is substituted for the variable capacity pump 30 and the suction side of said pump 65 is provided with an inlet control valve, broadly designated by the numeral 67, an enlarged sectional view of which is shown in Fig. 4. The driving shaft of the pump 65 is connected to the cam shaft of the engine 10 as in the former embodiment and as indicated by the dotted lines at 66 in Fig. 3.

In this instance the inlet control valve housing 68 is formed integrally with the casing of the pump 65 and comprises a horizontal valve bore 69 having a counterbored portion 70 which connects with the suction port 71 of said pump 65. One end of the return pipe 33 connects with the valve bore 69 at a point to the rear of the counterbore 70, as at the port 72. Within the valve bore 69 is the slidably fitted valve member 73 having a cylindrical head 74 and a tapered portion 75 terminating in the valve stem 76 which passes through a suitable opening in the rear or closed end of said valve bore 69. The forward end of the valve bore 69 is closed by any appropriate means such as the threaded plug 78. The head 74 is provided with a longitudinal groove 77 which permits the escape of fluid trapped between the end of said valve member 73 and the plug 78 and which also maintains communication between the counterbore 70 and the return pipe 33 when said valve member 73 is in its closed position, thus assuring a supply of fluid at the suction port 71 at all times. The valve stem 76 is movably connected with one end of the link 79 whose other end is pivotally connected with the depending arm of the bell crank 22.

The arrangement is such that the valve member 73 is in its fully open position, as shown in Figs. 3 and 4, when the butterfly valve 16 and associated parts are in the position causing the engine 10 to run at idling speed. Substantially no resistance is then offered to the flow of fluid from the return pipe 33 into the suction port 71 and the pump 65 then delivers its full capacity per revolution. As the accelerator pedal 18 is depressed and the butterfly valve 16 begins to open, causing the speed of the engine 10 to increase, the link 79 is moved rearwardly by the depending arm of the bell crank 22 and carries with it the valve member 73; as the valve member 73 moves, the tapered portion 75 reduces the open fluid passageway between the return pipe 33 and the counterbore 70 and a gradual throttling effect is thus produced. The flow of fluid into the suction port 71 of the pump 65 is thus restrained so that fluid does not enter said suction port 71 rapidly enough to completely fill the intaking portions of the pump 65 and the delivery per revolution of said pump 65 is thus reduced. As the pump 65 is directly connected to and driven by the cam shaft of the engine 10, its speed will obviously be increased as the engine speed increases, but as the delivery per revolution of said pump 65 is at the same time reduced, the volume of fluid discharged in any time period by said pump 65 is held to a substantially constant quantity, the increase in pump speed being offset by the decrease in delivery per revolution. Similarly, the delivery per revolution of the pump 65 is increased proportionally as the engine speed is decreased. By properly proportioning the parts, the device will deliver a substantially constant volume of fluid in any given period of time, regardless of the speed of the driving engine 10.

It will be understood that the position of the throttle valve 16 depends upon the speed at which it is desired to operate the engine, and consequently the position of this valve is responsive to the speed of the engine. It will also be understood that if desired, a centrifugally actuated device, such for example as a fly-ball governor mechanism may be employed to actuate the link 63 or 79 and thereby regulate the operation of the corresponding pumps 30 or 65 in such a manner as to cause these pumps to deliver a substantially constant output.

While in the second embodiment of this invention the portion 75 of the valve member 73 has been described as tapered, it is to be understood that the term "tapered" is used broadly and that said portion 75 may take any shape or variable diameter necessary to produce the corresponding required throttling effect in all its various positions as determined by the engine speed control apparatus. It is also to be understood that any other type of throttling mechanism may be substituted if preferred.

It is to be understood that the above is merely an exemplifying disclosure, and that changes may be made in the apparatus without departing from the applicant's invention which is defined in the appended claims.

I claim:

1. In combination, a pump, variable speed driving means for said pump, manually operated speed control means for said variable speed driving means, and means responsive to said speed control means for varying the volume of fluid discharged per revolution of said pump in substantially inverse ratio to the speed of said driving means to cause said pump to deliver a substantially constant output independent of its speed.

2. The combination of a pump, variable speed driving means for the pump, output control means for varying the amount of fluid discharged per revolution of said pump, manually operated speed control means for regulating the speed of said driving means, and means interconnecting said output control means and said speed control means to cause said pump to deliver a substantially constant output independent of its speed.

3. In combination, a variable capacity pump, variable speed driving means for said pump, manually operated speed control means for said driving means, and means responsive to said speed control means for varying the capacity of said pump in substantially inverse ratio to the speed of said driving means to cause said pump to deliver a substantially constant output independent of its speed.

4. In combination, a constant displacement pump, variable speed driving means for said pump, speed control means for said driving means, a valve adapted to control the admission of fluid to the intake of said pump, and means responsive to said speed control means for actuating said valve to vary the rate at which fluid is admitted to said pump thereby varying the discharge of said pump per revolution in substantially inverse ratio to the speed of said driving means.

5. The combination with a constant displacement pump driven by a variable speed driving means, of a valve connected to the intake of said pump, and means responsive to the speed of said driving means for controlling said valve to cause said pump to deliver a substantially constant output throughout the speed range of said driving means.

6. In a motor vehicle propelled by an internal combustion engine having manually operated means for controlling the speed thereof, the combination of a pump driven by said engine, output control means for varying the amount of fluid discharged per revolution of said pump, said output control means being operated by said engine speed control means to cause said pump to discharge operating fluid at a substantially constant rate of flow throughout the speed range of said engine.

7. In a motor vehicle propelled by an internal combustion engine having manually operated means for controlling the speed thereof, the combination of a variable capacity pump driven by said engine, and means operated by said engine speed controlling means for varying the capacity of said pump substantially inversely with the speed of said engine to thereby supply a substantially constant volume of fluid throughout the speed range of said engine.

8. In a motor vehicle propelled by an internal combustion engine having manually operated means for controlling the speed thereof, the combination of a constant displacement pump driven by said engine, a valve mechanism controlling the admission of fluid to the intake of said pump and means operated by said engine speed controlling means for actuating said valve to vary the rate of admission of said fluid to said intake substantially inversely with the speed of said driving engine to cause said pump to discharge fluid at a substantially constant rate of flow throughout the speed range of said engine.

9. The combination of a constant displacement pump, variable speed driving means for said pump, speed control means for said driving means, a valve connected with the intake of said pump having a casing provided with inlet and outlet ports, a tapered valve member cooperating with one of said ports to gradually close or open the same, and means for actuating said valve member to vary the output of said pump, said valve actuating means being operated by said speed control means.

10. In combination, a variable displacement pump, variable speed driving means for said pump, speed control means for said driving means acting to control the speed of said driving means independently of said pump, and means responsive to said speed control means to vary the discharge of said pump per revolution in substantially inverse ratio to the speed of said driving means.

11. In combination, a constant displacement pump, variable speed driving means for said pump, manually operated means for controlling the speed of said driving means, a valve mechanism controlling the admission of fluid to the intake of said pump, and means operated by said speed controlling means for actuating said valve to vary the rate of admission of said fluid to said intake substantially inversely with the speed of said driving means to cause said pump to discharge fluid at a substantially constant rate of flow throughout the speed range of said driving means.

HUGO A. CENTERVALL.